(12) United States Patent
Larsson et al.

(10) Patent No.: US 12,131,838 B2
(45) Date of Patent: Oct. 29, 2024

(54) SYSTEM AND METHOD FOR DEGASSING CABLES

(71) Applicant: NEXANS, Courbevoie (FR)

(72) Inventors: Björn Larsson, Halden (NO); Erik Markus Jarvid, Kungälv (SE); Quentin Eyssautier, Hafslundsøy (NO); Andreas Nyborg, Halden (NO); Laurent Jenart, Baudour (BE)

(73) Assignee: NEXANS, Courbevoie (FR)

( * ) Notice: Subject to any disclaimer, the term of this patent is extended or adjusted under 35 U.S.C. 154(b) by 204 days.

(21) Appl. No.: 17/960,701

(22) Filed: Oct. 5, 2022

(65) Prior Publication Data

US 2023/0268102 A1 Aug. 24, 2023

(30) Foreign Application Priority Data

Oct. 12, 2021 (NO) .................................. 20211229

(51) Int. Cl.
| | |
|---|---|
| *H01B 13/06* | (2006.01) |
| *H01B 13/00* | (2006.01) |
| *H01B 13/14* | (2006.01) |
| *H02G 11/02* | (2006.01) |

(52) U.S. Cl.
CPC ....... *H01B 13/145* (2013.01); *H01B 13/0016* (2013.01); *H02G 11/02* (2013.01)

(58) Field of Classification Search
CPC .................................................. H01B 13/145
See application file for complete search history.

(56) References Cited

FOREIGN PATENT DOCUMENTS

| CN | 1862714 | 11/2006 |
|---|---|---|
| DE | 3003156 | 8/1981 |
| JP | 2-145719 U | * 12/1990 |
| JP | 06325646 | 11/1994 |
| JP | 11203967 | 7/1999 |

OTHER PUBLICATIONS

Search Report dated Apr. 21, 2022.

* cited by examiner

*Primary Examiner* — Jeffry H Aftergut
(74) *Attorney, Agent, or Firm* — IPSILON USA, LLP

(57) ABSTRACT

A system and method for degassing cables, such as e.g. High-Voltage Alternative Current (HVAC) or High-Voltage Direct Current (HVDC) cables, where the system has a reel having a perforated cylinder wall and sealing elements adapted to seal off the inner space of the reel, a gas duct in fluid connection with the inner space, and a source of pressurised and heated gas fluidly connected to the gas duct. The method incudes winding a cable onto the reel and blow heated and pressurised gas into the inner space of the reel/cylinder.

18 Claims, 7 Drawing Sheets

SYSTEM AND METHOD FOR DEGASSING CABLES

RELATED APPLICATION

This application claims the benefit of priority to Norwegian Patent Application No. 2021 1229, file don Oct. 12, 2021, the entirety of which is incorporated by reference.

FIELD OF THE INVENTION

The present invention relates to a system and method for degassing cables, such as e.g. High-Voltage Alternative Current (HVAC) cables.

BACKGROUND AND PRIOR ART

In medium voltage (MV), high voltage (HV) and extra high voltage (EHV) cables, each conductor of the cable is typically surrounded by several layers including an inner semiconductive layer, an insulation layer, and an outer semiconductor layer.

One or more layers of crosslinked polyethylene is commonly applied as electric insulation in power cables. The crosslinking improves the polymer's resistance to deformation at elevated temperatures, as well as its mechanical strength and/or chemical resistance.

The free radical generating agent, such as an organic peroxide, is typically incorporated to the layer material prior to extruding/layer(s) on a conductor. After formation of the layered cable, the cable is then subjected to a crosslinking step to initiate the radical formation and thereby crosslinking reaction.

The crosslinking reactions between polyethylene and dicumyl peroxide produces some unwanted decomposition products such as e.g. methane, cumyl alcohol and acetophenone. These by-products may accumulate and cause problems. For example, accumulation of methane poses a risk of fire/explosion during handling and installation of the cable while cumyl alcohol and acetophenone influence the electrical properties such as charge generation and/or charge transport through the cable insulation potentially leading to a dielectric failure in the cable.

There is thus a need for degassing of the cables at the manufacturing stage to remove methane, cumyl alcohol, acetophenone, and other unwanted decomposition products to safe levels in the polymer layers of the cables.

Andersson et al. 2011[1] discusses a study of degassing of XLPE HV cables. The study was made on a 520 m long cable which was winded in a total of five layers on a M30 reel without venting holes, see FIG. 1. The reel 100 had an outer diameter of 3 m, inner diameter of 1.5 m, and width of 1.5 m. The cable reel with cable was placed for 48 hours in a degassing chamber of dimensions 12.7 m×3.3 m×3.5 m flushed with 1.7 $m^3$/s air holding 70° C.

EP 2 983 176 teaches a method for preparing a crosslinked cable, comprising the steps of: providing a cable comprising a crosslinked polymer composition, —reducing or eliminating the content of rest(s) or byproduct(s) from the crosslinking, this step being referred to as a degassing step, characterized in that the degassing step is done by supplying heated air through openings in the bottom of a degassing device in which the cable is arranged.

From EP 2 932 511 it is known a method for heat treatment of an electric power cable, the electric power cable comprising a polymer-based electrical insulation system comprising a polymer composition, the method comprising the steps of placing the electric power cable having the polymer-based electrical insulation system into a heating chamber; and exposing the polymer-based electrical insulation system to a heat treatment procedure when the electric power cable is located in the heating chamber. The step of placing the electric power cable into the heating chamber comprises winding the electric power cable about a substantially vertical center axis (z-z) to form a substantially horizontal first layer of a plurality of substantially horizontal turns of the electric power cable; winding the electric power cable about the center axis to form a plurality of substantially horizontal second layers, each second layer being formed by a plurality of substantially horizontal turns of the electric power cable; and stacking the plurality of horizontal second layers above the first layer. And an apparatus for performing the method.

OBJECTS AND SUMMARY

The main objective of the invention is to provide a system and a method for degassing cables.

The present invention is based on the realisation that the degassing of cables may be performed without need for a dedicated degassing chamber by applying a reel having a perforated core and blowing heated gas through the perforations to force the gas through the layers of cable wound up on the reel.

In a first aspect, the invention relates to a system for degassing cables, comprising:
 a reel comprising:
  a hollow cylinder having a cylinder wall with an inner surface facing an inner space of the cylinder and an outer surface, and
  a first flange located at a first end of the cylinder and a second flange located at a second end of the cylinder, and wherein the
 first and second flange extend a distance outwards in radial direction from the outer surface of the cylinder, characterised in that the system further comprises:
 a first and second sealing element adapted to, when attached to the first and second end of the cylinder, respectively, to delimit the inner space of the hollow cylinder,
 a gas duct in fluid connection with the inner space, and
 a source of pressurised and heated gas fluidly connected to the gas duct, and wherein
 the cylinder wall has a plurality of throughgoing perforations.

As applied herein, the term "first or the second end of the cylinder" refers to the curved edge formed between the closed circular surface (the cylinder wall) and the circular bases defining the hollow cylinder of the reel.

As applied herein, the term "flange" refers to one of the two "sidewalls" extending a distance up from the outer surface of the hollow cylinder, and which defines the space for taking up the cable to be winded onto the reel. The first and second flange are congruent and shaped as an annular disc having an inner diameter d1 and an outer diameter d2.

An advantage of the present invention is that it enables avoiding applying a dedicated degassing chamber for degassing crosslinked cables. The cable may simply after being manufactured and subject to the crosslinking procedure, be wound onto a reel according to the invention and then subject to a degassing procedure according to the method of the second aspect of the invention. An example embodiment of the reel according to the first aspect of the invention is shown schematically in FIG. 2. The figure is plane cut drawing as seen from the side and shows that the reel comprises a cylinder 2 of length L and outer diameter d1 having at each end 9, 10 of the cylinder, a flange 6, 7 extending a distance in radial direction outward from the cylinder 2. The flange is thus shaped as an annular disc having an inner diameter d1 and an outer diameter d2, where d2>d1. A cable may be wound onto the reel in the space defined between the outer surface 5 of the cylinder and the inside of the flanges 6, 7 such as illustrated in FIG. 1. In FIGS. 2, 3a) and 3b), the cable is not shown for the cause of simplicity and because the cable as such is no part of the claimed system.

The invention according to the first aspect of the invention is not tied to any specific design, dimensions or construction of the reel as long as there is a plurality of throughgoing perforations/holes in the cylinder wall enabling to force a gas through the cylinder wall. Any reel known to the skilled person suited for winding up a cable may be applied. The throughgoing perforations/holes in the cylinder wall may in one embodiment be evenly distributed along the surface of the cylinder wall. I.e., the throughgoing perforations/holes are distributed evenly along the full length of the cylinder wall between the flanges 6, 7 and over the entire circumference of the cylinder wall.

FIG. 3 a), which is a plane cut drawing as seen from the side, illustrates an embodiment of the system according to the first aspect of the invention. The figure shows the same reel as in FIG. 2 and the first 11 and second 12 sealing element. In this embodiment, the sealing elements are shapes as lids being releasably attachable to the ends 9, 10 of the cylinder 2. The feature of being releasably attachable enables applying the sealing elements to be applied on successive reels to degas cables and removes the need for rewinding the cable onto another reel for subsequent handling, transport, storing, etc. of the cable, but instead keep the cable on the same reel from manufacturing to the end-use. However, invention according to the first aspect of the invention is not tied to any specific sealing element as long as the sealing elements 11, 12 are shaped and dimensioned to forming an end wall, lid, etc. substantially gas tight closing the ends 9, 10 of the cylinder 2 and isolating the inner space 4 from its surroundings. In one embodiment, the sealing elements 11, 12 may be permanently attached to the first 9 and second 10 end of the cylinder 2, respectively. In this embodiment, the source 14 of heated pressurised gas is a blower having a heating element which sucks ambient air, heats the air to the intended temperature and blows it into the inner space 4 via gas duct 13. Alternatively, the source 14 of heated pressurised gas may be a heated fan which sucks ambient air, heats the air to the intended temperature and blows it into the inner space 4 via gas duct 13.

FIG. 3 b) illustrates the same embodiment as FIG. 3 a), but with the sealing elements 11, 12 attached to the cylinder and with the source 14 of heated and pressurised gas engaged such that heated air is injected into the inner space 4 where it will be distributed and move to towards the cylinder wall and exit through the perforations 8 and in-between the cable wounded onto the reel (the cable is not shown in the figure) and exit to the surroundings after flowing through the layers of wounded cable. The air flow is illustrated schematically by the black arrows. The In one embodiment, the system according the first aspect of the invention may further comprise a degassing chamber 30 dimensioned to house the reel 1 including the first 11 and second 12 sealing element, and the gas duct 13, and wherein the degassing chamber 30 comprises an air intake 31 of heated air and an air outlet 32 for venting out air. In one embodiment, the source 14 of pressurised and heated gas may be arranged to collect air from within the degassing chamber, from the outside of the degassing chamber or a combination of both. In one embodiment, the air exiting through the air outlet may be recirculated by being injected to the degassing chamber via the air inlet.

In a second aspect, the invention relates to a method for degassing a cable, wherein the method comprises:
applying a system according to the first aspect of the invention,
winding the cable onto the reel of the system, and
attaching the first and second to the first and second end of the cylinder, respectively, and
injecting, by engaging the source of heated and pressurised gas to the inner space for a period of time.

As applied herein, the term "crosslinked cable" refers to a power cable containing one or more (chemical) phases, layers etc. of a polymer having been mixed with crosslinking reactants and which has gone through a crosslinking chemical reaction step and is in need for venting out gaseous and volatile by-products formed by the crosslinking reactions. The invention according to the first and second aspect of the invention is not tied to any specific crosslinked polymer or crosslinking polymer 10 reactions, but may apply any cable containing one or more (chemical) phases of any crosslinked polymer containing gaseous or volatile reaction by-products which should be removed from the cable/crosslinked polymer. In one embodiment, the crosslinked polymer of the cable to be degassed may be crosslinked polyethylene (XLPE). In one embodiment, the cable is a High-Voltage Alternative Current (HVAC) cable. In one embodiment, the cable is a High-Voltage Direct Current (HVDC) cable In one embodiment, the heated gas has a temperature in the range of 50 to 80° C., preferably 70°. The pressure of the gas/air being injected into the inner space 4 may in one embodiment be in the range from 1.001 to 2 atm, preferably from 1.005 to 1.75 atm, more preferably from 1.01 to 1.5 atm, and most preferably from 1.02 to 1.2 atm. However, the invention according to the first aspect of the invention is not tied to any specific source of gas. The invention may apply any source of heated gas known to the skilled person suited for being applied to degas a crosslinked cable. In one embodiment, the heated and pressurised gas is air.

In one embodiment, the method according to the second aspect of the invention may further comprise laying one or more rods in-between the layers of cable wounded on the reel to create air-flow channels through the cable layers. In one embodiment, the rods may be made of polyurethane.

In one embodiment, the method according to the second aspect of the invention further comprises, at regular intervals of time, taking a sample from the outermost layer of wounded cable on the reel and measuring the content of cumyl alcohol, and/or acetophenone and/or methane in the sample and terminate the degassing when reaching a content below a predetermined safe level in the sample.

In one embodiment, the sample is analysed by high performance liquid chromatography (HPLC) to determine the methane content in the sample, and to stop the degassing procedure when the measured methane concentration in the sample becomes less than 50 ppm, preferably less than 30 ppm.

BRIEF DESCRIPTION OF THE DRAWINGS

FIG. 3 b) is a plane cut drawing as seen from the side of the same example embodiment as shown in FIG. 3 a), but with the sealing elements attached to the cylinder and the source 14 of heated and pressurised gas injecting gas into the inner space of the reel.

DETAILED DESCRIPTION

Figure 1:
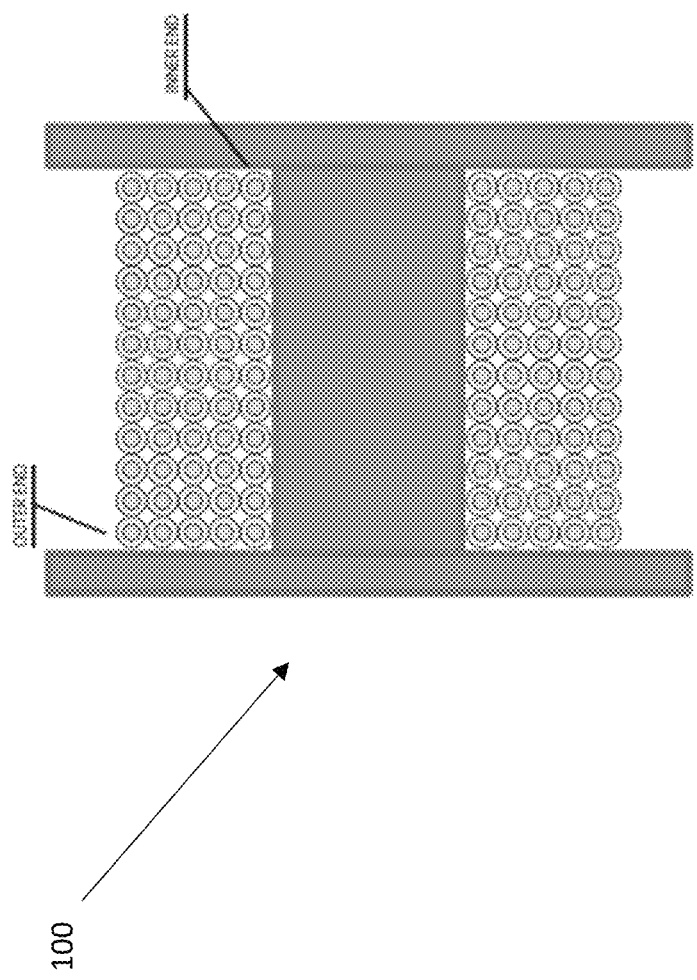
FIG. 1 is a drawing illustrating a cable wound onto a reel (prior art).
Figure 2:
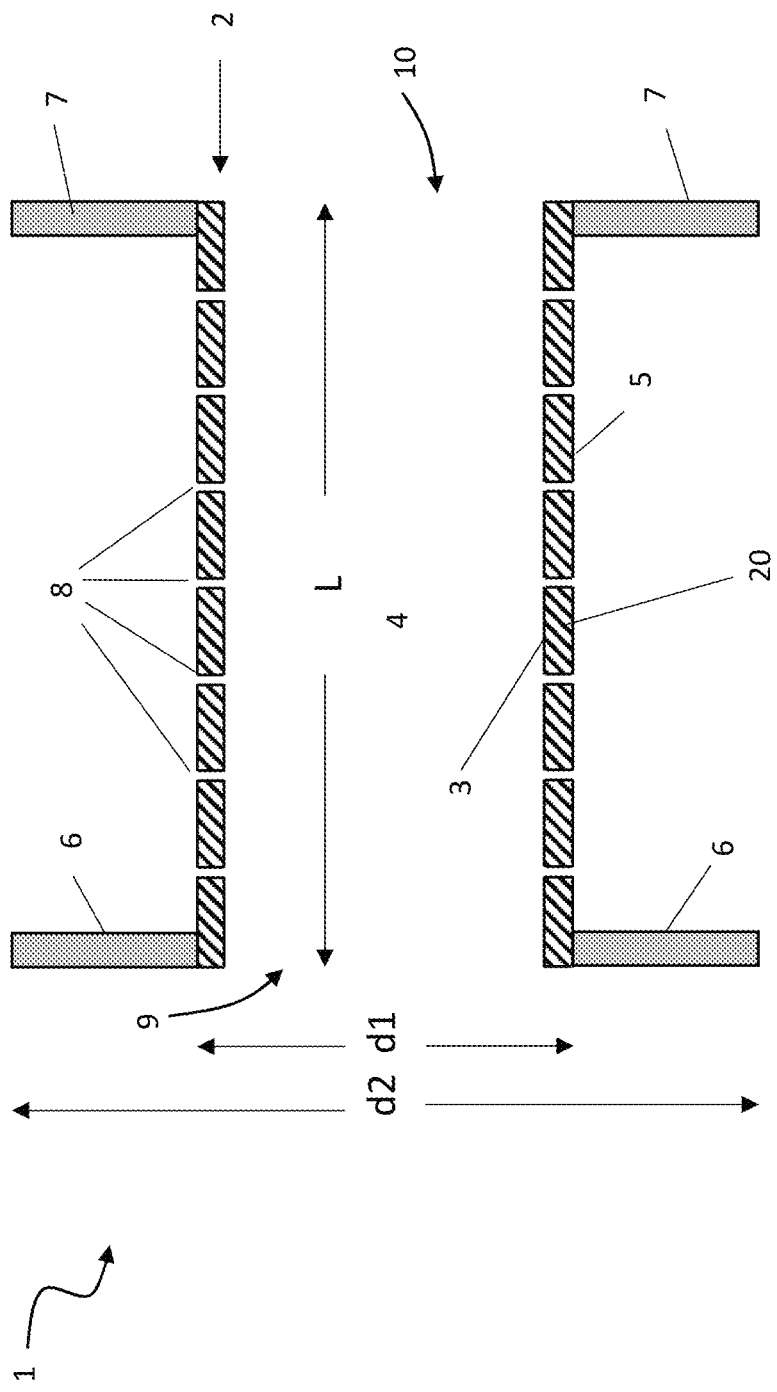
FIG. 2 is a plane cut drawing as seen from the side of an example embodiment of the reel according to the first aspect of the invention.
Figure 3:
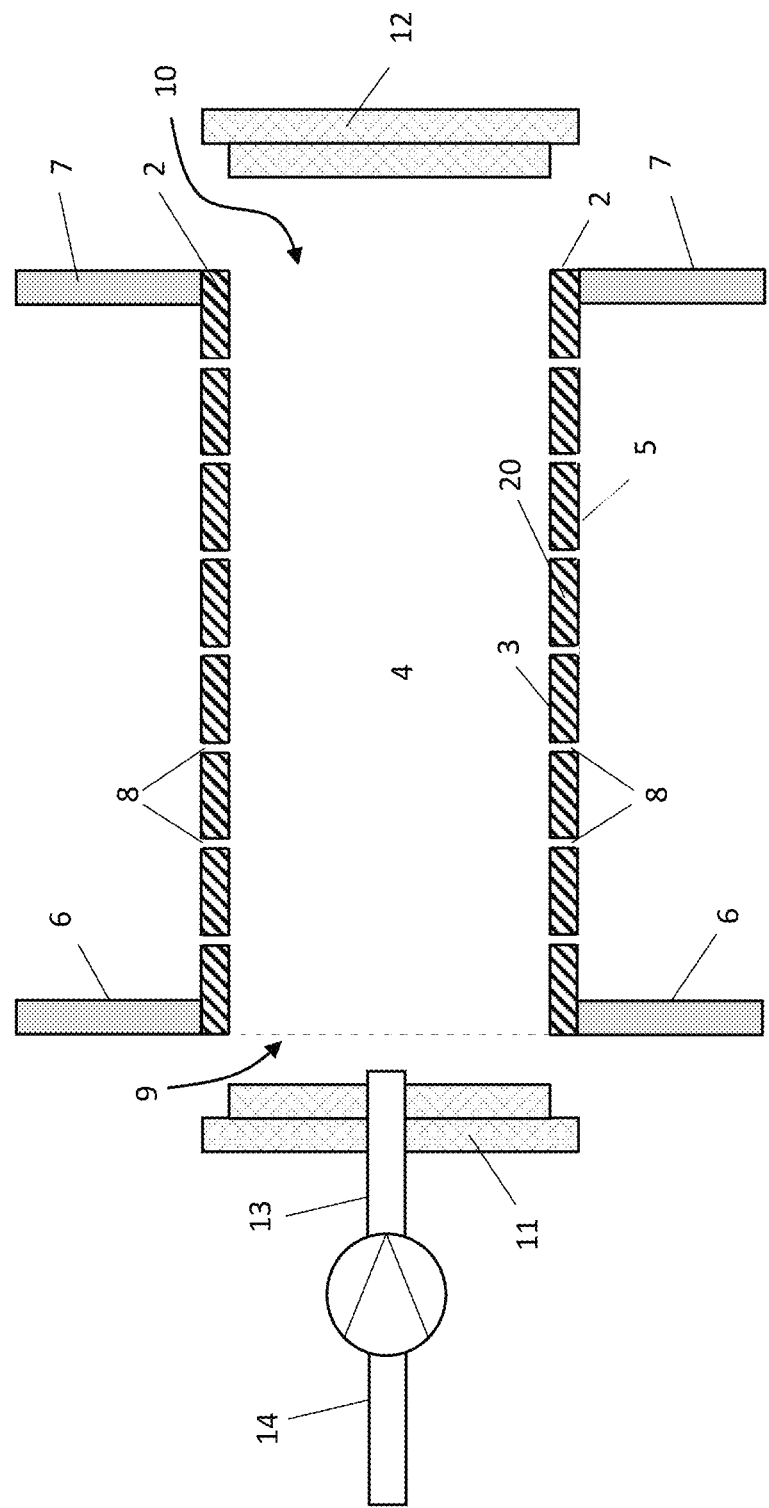
FIG. 3 a) is a plane cut drawing as seen from the side of an example embodiment of the system according to the first aspect of the invention.
Figure 3:
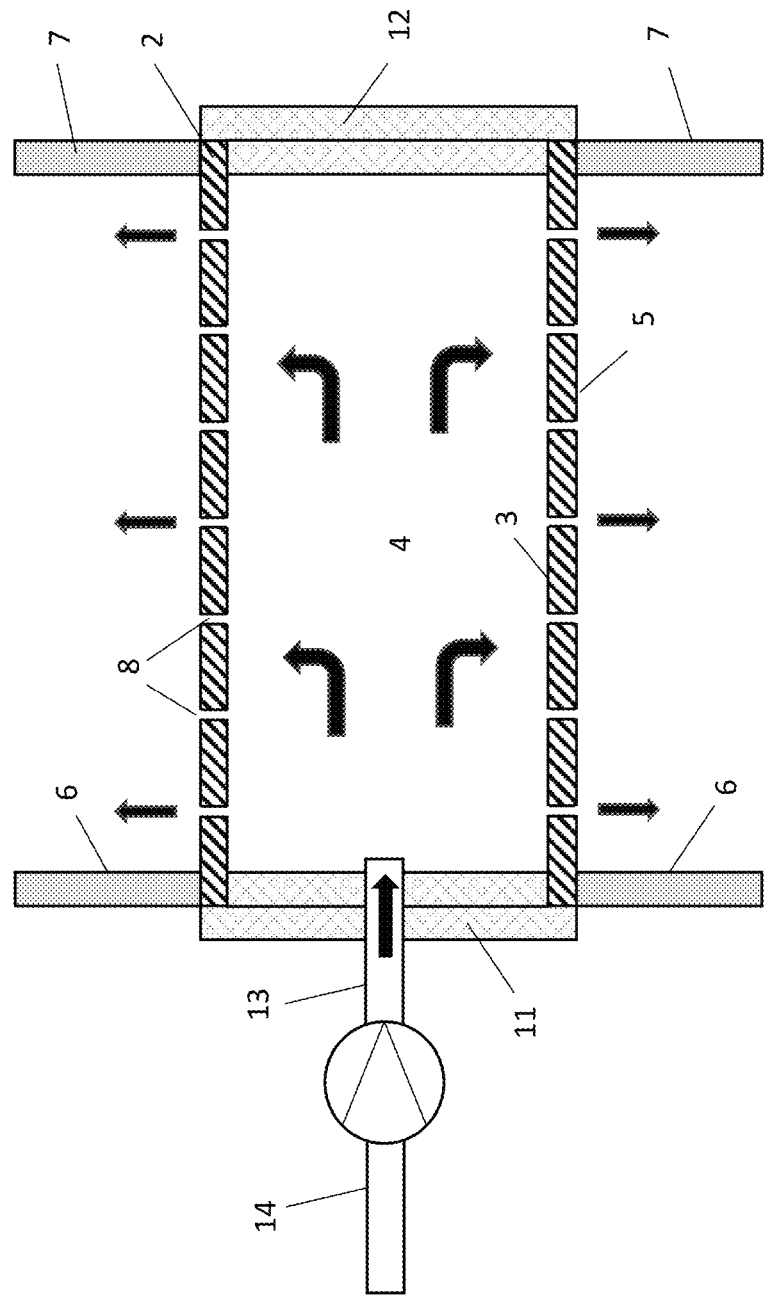
Figure 4:
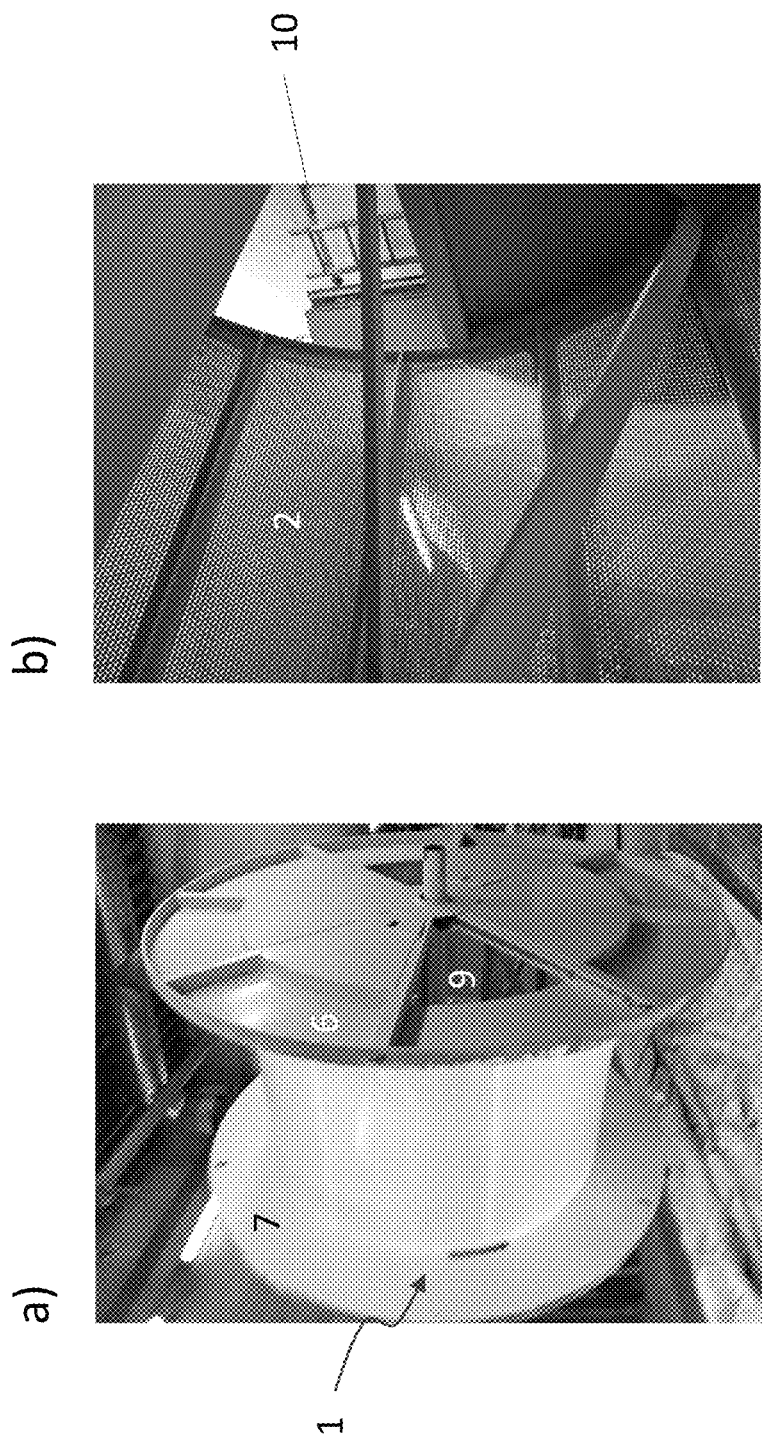
FIGS. 4 a) and b) are photographs showing an example embodiment of a reel according to the first aspect of the invention.
Figure 5:
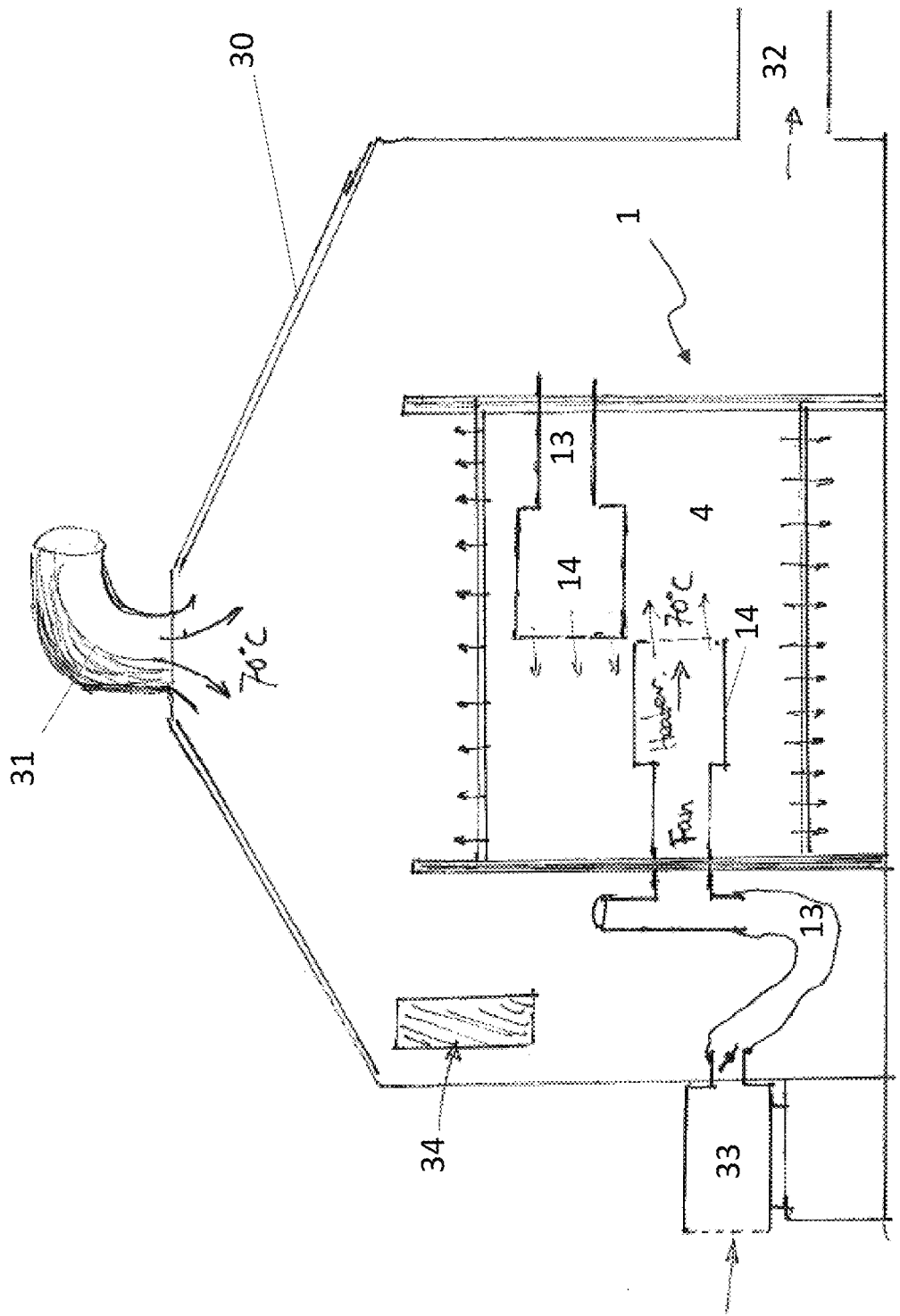
FIG. 5 is a cut-plane view drawing as seen from the side of an example embodiment of the system according to the first aspect of the invention.

An example embodiment of the system according to the invention is shown in FIGS. 4 and 5.

In this example embodiment, the reel 1 was a 4.2 in diameter and 3.0 m in length steel drum with a plurality of 10 mm holes in the cylinder wall. The flanges and cylinder walls where coated with 3 to 4 mm thick layer of polyurethane. The drum is photographed from in FIG. 4 a) and from inside the cylinder core in FIG. 4 b). as seen from the photograph of FIG. 4 b), the cylinder wall 2 had a plurality of thoroughgoing perforations.

This example embodiment of the system comprises the reel shown in FIGS. 4 a) and b) located inside a degassing chamber 30. The cable to be degassed and wound on the reel 1 is not shown for the reasons of clarity. The degassing chamber has an air inlet 31 for injecting heated air at 70° C. into the interior of the degassing chamber and an air outlet 32. The air exiting through air outlet 32 are tempered and passed back to the air inlet 31 to reduce the need for drying energy.

In this example embodiment, the source 14 of heated gas is two fan heaters (of 20 kW each) located in the inner space 4 of the reel. One fan heater collects air via a gas duct 13 and injects it into the inner space 4, while the other fan heater has a gas duct 13 connected to a filter unit 33 which draws air from outside of the degassing chamber. The degassing chamber has further a ventilation opening for ventilating out excess air.

The system according to the example embodiment 1 has been applied in a degassing test on a 1.3 km long 320 kV HVDC cable wounded onto the reel 1 described above. The cable was wounded in five layers, each layer counted sixteen rounds of cable. The reel with the cable was placed in a degassing chamber as described in example 1 and subject to a standard length degassing test.

Figure 6:
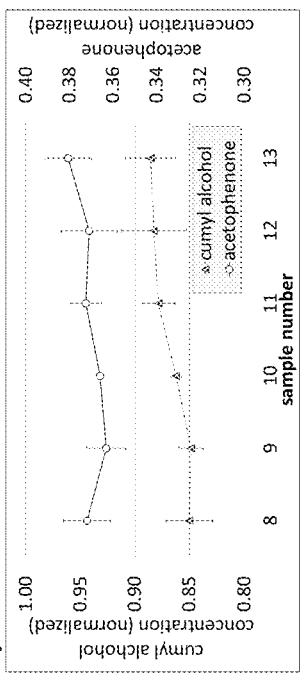
FIG. 6 a) to c) are graphical representations of measured contents of cumyl alcohol and acetophenone at different positions in a HVDC cable subject to a degassing according to the invention. The test positions are shown in FIG. 6 d).
Figure 6:
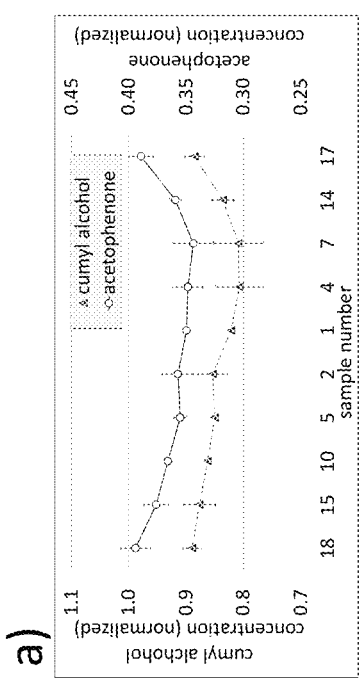
Figure 6:
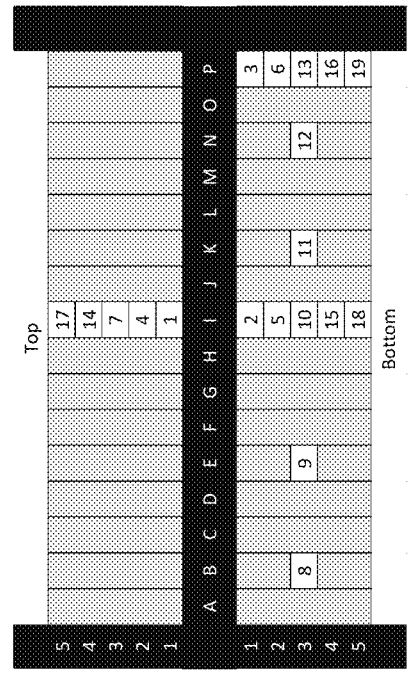
Figure 6:
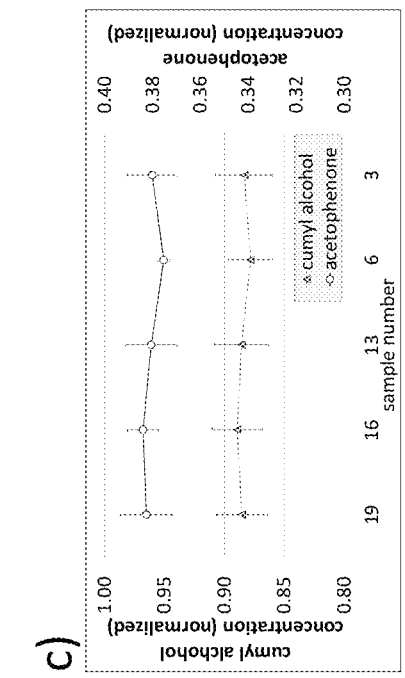

After the degassing test, nineteen test samples of the crosslinked XLPE was taken at different positions in the wounded cable and each sample were subject to a high performance liquid chromatography analysis to establish the content of cumyl alcohol and acetophenone. The positions of the wounded cable at which the test samples were taken from is shown in FIG. 6 d). The measured cumyl alcohol and acetophenone levels are presented graphically in FIGS. 6 a) to 6 c).

As seen from the graphical representations in FIGS. 6 a) to 6 c), the degassing is found to be more efficient close to the core and less efficient in the outer cable layers. This trend is, however, not repeated along the side as may be seen from FIG. 6 c). The horizontal distribution, is however, found to have very small variations. Looking at all the 19 data points it is found that the variation amounts to an RSD of 3.4%.

In addition, the temperature was monitored during the degassing at each of these nineteen test positions. The temperature monitoring showed that the temperature in all positions were within ±0.5° C. from the average temperature at steady state.

These results show that by supplying air from the drum core, it is possible to achieve both homogenous degassing as well as the benefit of having the worst case position on the outside of the drum. This facilitates good sampling and ensures that the worst-case degassing is considered.

REFERENCES

1 Andersson et al., "Distribution of Peroxide By-products along Degassed XLPE HV Cables", $8^{th}$ *International Conference on Insulated Power Cables*, Jicable'11-19-23 Jun. 2011, Versailles—France, E.7.1.3.

The invention claimed is:

1. A system for degassing cables, comprising:
a reel comprising:
   a hollow cylinder having a cylinder wall with an inner surface facing an inner space of the cylinder and an outer surface, and
   a first flange located at a first end of the cylinder and a second flange located at a second end of the cylinder, and wherein the first and second flange extend a distance outwards in radial direction from the outer surface of the cylinder,
wherein the system further comprises:
   a first and second sealing element adapted to, when attached to the first and second end of the cylinder, respectively, to delimit the inner space of the hollow cylinder,
   a gas duct in fluid connection with the inner space, and
   a source of pressurised and heated gas fluidly connected to the gas duct, and wherein
   the cylinder wall has a plurality of throughgoing perforations.

2. The system for degassing cables according to claim 1, wherein the first and the second sealing element is releasably attached to the first and second end of the cylinder, respectively.

3. The system for degassing cables according to claim 1, wherein the source of heated pressurised gas is a blower having a heating element or a heated fan, and which sucks ambient air, heats the air to an intended temperature and blows it into the inner space via gas duct.

4. The system for degassing cables according to claim 1, wherein the system further comprises a degassing chamber dimensioned to house the reel with the first sealing element, the second sealing element, and the gas duct, and wherein the degassing chamber comprises:
   an air intake of heated air, and
   an air outlet for venting out air.

5. The system for degassing cables according to claim 4, wherein the source of pressurised and heated gas is arranged to collect air from within the degassing chamber, from the outside of the degassing chamber, or a combination of both.

6. The system for degassing cables according to claim 4, wherein the air intake and the air outlet are adapted exchange heat such that rest heat in the air exiting through the air outlet is exchanged to heat air coming in through the air intake.

7. A method for degassing a crosslinked cable, wherein the method comprises:
   applying a system according to claim 1,
   winding the crosslinked cable onto the reel of the system, and
   attaching the first and second sealing element to the first and second end of the cylinder, respectively, and
   injecting, by engaging the source of heated and pressurised gas to the inner space for a period of time.

8. The method for degassing a crosslinked cable according to claim 7, wherein the gas to be injected into the inner space is heated to a temperature in the range of 50 to 80° C.

9. The method for degassing a crosslinked cable according to claim 7, wherein the gas to be injected into the inner space is pressurised to a pressure in the range from 1.001 to 2 atm.

10. The method for degassing a crosslinked cable according to claim 7, wherein the gas to be injected into the inner space is air.

11. The method for degassing a crosslinked cable according to claim 7, wherein the cable to be degassed is a High-Voltage Alternative Current (HVAC) comprising crosslinked polyethylene, or a High-Voltage Direct Current (HVDC) cable comprising crosslinked polyethylene.

12. The method for degassing a crosslinked cable according to claim 7, wherein the method further comprises, at regular intervals of time, taking a sample from the outermost layer of wounded cable on the reel and measuring the content of cumyl alcohol, and/or acetophenone and/or methane in the sample and terminate the degassing when reaching a content below a predetermined safe level in the sample.

13. The method for degassing a crosslinked cable according to claim 12, wherein the sample is analysed by high performance liquid chromatography (HPLC) to determine the methane content in the sample, and where the predetermined safe level is less than 50 ppm by mass.

14. The method for degassing a crosslinked cable according to claim 8, wherein the gas to be injected into the inner space is heated to a temperature of 70° C.

15. The method for degassing a crosslinked cable according to claim 9, wherein the gas to be injected into the inner space is pressurised to a pressure in the range from 1.005 to 1.75 atm.

16. The method for degassing a crosslinked cable according to claim 9, wherein the gas to be injected into the inner space is pressurised to a pressure in the range from 1.01 to 1.5 atm.

17. The method for degassing a crosslinked cable according to claim 9, wherein the gas to be injected into the inner space is pressurised to a pressure in the range from 1.02 to 1.2 atm.

18. The method for degassing a crosslinked cable according to claim 13, wherein the sample is analysed by high performance liquid chromatography (HPLC) to determine the methane content in the sample, and where the predetermined safe level is less than 30 ppm by mass.

* * * * *